US012563062B2

(12) United States Patent
Murakawa et al.

(10) Patent No.: US 12,563,062 B2
(45) Date of Patent: Feb. 24, 2026

(54) DETECTION SYSTEM, DETECTION METHOD, AND RECORDING MEDIUM

(71) Applicant: Panasonic Intellectual Property Corporation of America, Torrance, CA (US)

(72) Inventors: Yasushi Murakawa, Fukuoka (JP); Akira Kamogawa, Osaka (JP); Seiichi Muroya, Osaka (JP); Hiroyasu Terazawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 288 days.

(21) Appl. No.: 18/116,152

(22) Filed: Mar. 1, 2023

(65) Prior Publication Data

US 2023/0216873 A1 Jul. 6, 2023

Related U.S. Application Data

(63) Continuation of application No. PCT/JP2021/026852, filed on Jul. 16, 2021.

(30) Foreign Application Priority Data

Sep. 17, 2020 (JP) ................................. 2020-155938

(51) Int. Cl.
*H04L 9/40* (2022.01)
(52) U.S. Cl.
CPC ...... *H04L 63/1425* (2013.01); *H04L 63/1416* (2013.01); *H04L 63/1458* (2013.01)

(58) Field of Classification Search
CPC ............. H04L 63/1425; H04L 63/1416; H04L 63/1458; H04L 2012/40215;
(Continued)

(56) References Cited

U.S. PATENT DOCUMENTS 11,115,426 B1 * 9/2021 Pazhyannur ........ H04L 41/0686
2004/0015582 A1 1/2004 Pruthi
(Continued)

FOREIGN PATENT DOCUMENTS

EP          3659868          6/2020
JP     2018-022296          2/2018
(Continued)

OTHER PUBLICATIONS

International Search Report (ISR) from International Searching Authority (Japan Patent Office) in International Pat. Appl. No. PCT/JP2021/026852, dated Sep. 21, 2021, together with an English language translation.
(Continued)

*Primary Examiner* — Trong H Nguyen
(74) *Attorney, Agent, or Firm* — Greenblum & Bernstein, P.L.C.

(57) ABSTRACT

A detection system includes an obtainer that obtains a first log, the first log being a log of communication in a first network; a determiner that determines whether the first log obtained by the obtainer includes anomaly information indicating anomalous communication in a second network; and a controller that, when the determiner has determined that the first log includes the anomaly information, performs control of notifying of an anomaly in the second network.

7 Claims, 8 Drawing Sheets

(58) Field of Classification Search

CPC .......... H04L 2012/40273; H04L 67/12; G06F 21/564; G06F 21/552; G06F 21/554; H04W 4/48

See application file for complete search history.

(56) References Cited

U.S. PATENT DOCUMENTS

| | | | |
|---|---|---|---|
| 2005/0060573 A1 * | 3/2005 | D'Souza | H04L 63/1441 713/153 |
| 2017/0279622 A1 | 9/2017 | Yamaguchi et al. | |
| 2019/0036946 A1 * | 1/2019 | Ruvio | H04W 12/10 |
| 2019/0190938 A1 * | 6/2019 | Oba | H04L 43/16 |
| 2020/0137099 A1 | 4/2020 | Haga et al. | |
| 2020/0220888 A1 | 7/2020 | Terazawa et al. | |
| 2021/0112091 A1 * | 4/2021 | Compton | H04L 63/1416 |

FOREIGN PATENT DOCUMENTS

| | | | |
|---|---|---|---|
| JP | 2020030653 A * | 2/2020 | |
| WO | 2016/114077 | 7/2016 | |
| WO | 2019/117184 | 6/2019 | |
| WO | WO-2019117184 A1 * | 6/2019 | ........... B60L 3/0023 |

OTHER PUBLICATIONS

Extended European Search Report (EESR) from European Patent Office (EPO) in European Patent Appl. No. 21869015.4, dated Feb. 15, 2024.

Kyung Chang Lee et al., "Network-based Fire-Detection System via Controller Area Network for Smart Home Automation," IEEE Transactions on Consumer Electronics, IEEE Service Center, New York, Ny, US, vol. 50, No. 4, Nov. 2004 (Nov. 2004), pp. 1093-1100, XP001224746.

* cited by examiner

Client information database (a)

| Client number | Vehicle registration number | Home registration number | Building registration number |
|---|---|---|---|
| 00001 | C00001 | H00001 | B00001 |
| 00002 | C00002 | - | B00002 |
| | C00003 | | B00003 |
| | | | B00004 |
| 00003 | C00004 | H00002 | - |
| | | H00003 | |
| 00004 | C00005 | H00004 | B00005 |
| | | | B00006 |

(b)

| C00001 | |
|---|---|
| Vehicle identification number | Shinagawa 599 ra NN-MM |
| IP address | 210.160.XXX.XXX |
| Phone number | 090-5432-XXXX |

(c)

| B00001 | |
|---|---|
| Address | A-B-C Ginza, Chuo-ku, Tokyo |
| IP address | 60.66.XXX.XXX |
| Email address | admin@example.com |
| Phone number | 03-5148-XXXX |
| FAX number | 03-5148-XXXX |

| EHD1 | EHD2 | TID | SEOJ | DEOJ | ESV | OPC | EPC | PDC | EDT |
|------|------|-----|------|------|-----|-----|-----|-----|-----|
|      |      |     |      |      |     |     |     |     |     |

(b)

| Field name | Contents | Size | Value |
|------------|----------|------|-------|
| EHD1 | ECHONET Lite message header 1 | 1 byte | 0x10 fixed |
| EHD2 | ECHONET Lite message header 2 | 1 byte | 0x81 fixed |
| TID | Transaction ID | 2 bytes | |
| SEOJ | Source object specification | 3 bytes | Example: 0x013001 Air conditioner / 0x029001 General lighting |
| DEOJ | Destination object specification | 3 bytes | |
| ESV | Service code | 1 byte | Example: 0x62 Read-out request |
| OPC | Number of processing properties | 1 byte | Number of EPC, PDC, EDT |
| EPC | Property number | 1 byte | Example: 0x80 Superclass |
| PDC | Byte count of EDT | 1 byte | |
| EDT | Property data | Specify by PDC | |

| BVLL header | BACnet header |
|---|---|

| BVLC type | BVLC function | BVLC length | Version | Control | BACnet APDU |
|---|---|---|---|---|---|

(b)

| Field name | Size | Value |
|---|---|---|
| BVLC type | 1 octet | 0x81 fixed |
| BVLC function | 1 octet | 0x0A (Unicast)<br>0x0B (Broadcast) |
| BVLC length | 2 octets | |
| Version | 1 octet | 0x01 fixed |
| Control | 1 octet | 0x04 (With response message)<br>0x00 (No response message) |
| BACnet APDU | 1024 octets or less | |

FIG. 9

| # | Time information | Header information | Payload information |
|---|---|---|---|
| 1 | T1 | H1 | P1 |
| 2 | T2 | H2 | P2 |
| ... | ... | ... | ... |

DETECTION SYSTEM, DETECTION METHOD, AND RECORDING MEDIUM

CROSS REFERENCE TO RELATED APPLICATIONS

This is a continuation application of PCT International Application No. PCT/JP2021/026852 filed on Jul. 16, 2021, designating the United States of America, which is based on and claims priority of Japanese Patent Application No. 2020-155938 filed on Sep. 17, 2020. The entire disclosures of the above-identified applications, including the specifications, drawings and claims are incorporated herein by reference in their entirety.

FIELD

The present disclosure relates to a detection system, a detection method, and a recording medium.

BACKGROUND

There is disclosed a monitoring controlling device for an industrial control system, and this device is aimed to promptly detect an attack on the system perpetrated from the outside (see Patent Literature 1).

Meanwhile, there is also disclosed a data determining device capable of detecting an attack that has attack communication embedded in the communication defined as being normal (see Patent Literature 2).

CITATION LIST

Patent Literature

PTL 1: Japanese Unexamined Patent Application Publication No. 2018-22296
PTL 2: International Patent Publication No. WO2016/114077

SUMMARY

Technical Problem

Despite the above, there are shortcomings in that a cyberattack perpetrated across a plurality of networks cannot be detected properly.

The present disclosure provides a detection system that properly detects a cyberattack perpetrated across a plurality of networks.

Solution to Problem

A detection system according to one aspect of the present disclosure includes: an obtainer that obtains a first log, the first log being a log of communication in a first network; a determiner that makes a determination as to whether the first log obtained by the obtainer includes anomaly information indicating anomalous communication in a second network; and a controller that performs control of notifying of an anomaly in the second network, when the determiner has determined that the first log includes the anomaly information.

It is to be noted that general or specific embodiments of the above may be implemented in the form of an apparatus, a method, an integrated circuit, a computer program, or a computer readable recording medium, such as a CD-ROM, or may be implemented in the form of any desired combination of an apparatus, a method, an integrated circuit, a computer program, and a recording medium.

Advantageous Effects

The detection system according to the present disclosure can properly detect a cyberattack perpetrated across a plurality of networks.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a first descriptive diagram illustrating a relationship among an integrated anomaly detection system according to an embodiment, an in-vehicle network, and so on.

FIG. 4 is a second descriptive diagram illustrating a relationship among an integrated anomaly detection system according to an embodiment, an in-vehicle network, and so on.

FIG. 5 is a third descriptive diagram illustrating a relationship among an integrated anomaly detection system according to an embodiment, an in-vehicle network, and so on.

FIG. 6 is a descriptive diagram illustrating a structure of a client information database according to an embodiment.

FIG. 7 is a descriptive diagram illustrating a frame format of ECHONET Lite (registered trademark) according to an embodiment.

FIG. 8 is a descriptive diagram illustrating a frame format of BACnet (registered trademark) according to an embodiment.

FIG. 9 is a descriptive diagram illustrating a log according to an embodiment.

DESCRIPTION OF EMBODIMENTS

Figure 1:
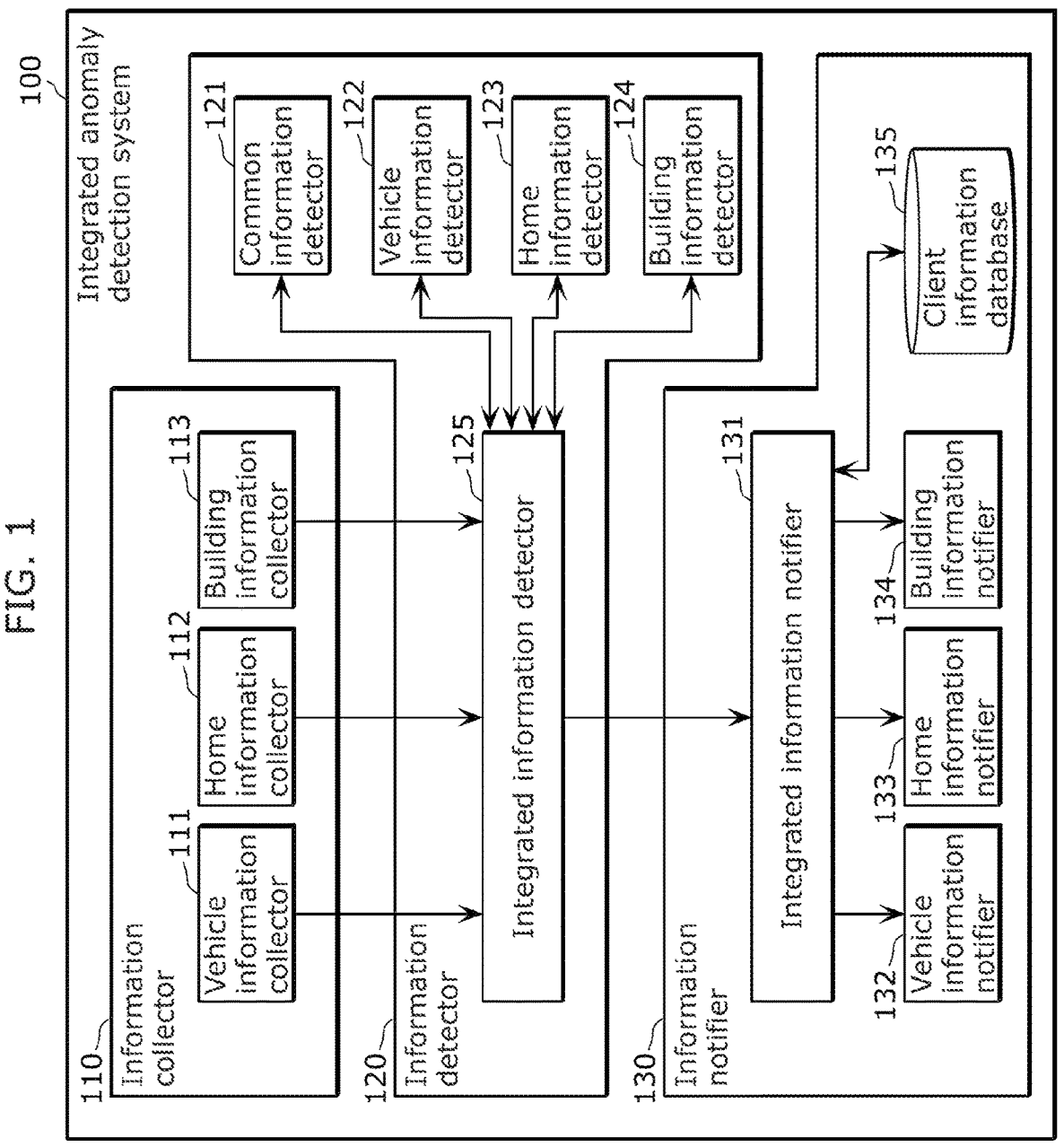
FIG. 1 is a block diagram illustrating a configuration of an integrated anomaly detection system according to an embodiment.

Underlying Knowledge Forming Basis of the Present Disclosure

The present inventors have found the following problems with respect to the security technology described in Background Art.

In recent years, facility networks at factories or the like can be targeted by cyberattacks, and security measures against such cyberattacks are in need. In addition, vehicles or buildings are now connected to the internet, and in a home environment as well, Internet of Things (IoT) devices are now connected to a home network. Thus, security measures similar to those for facility networks are needed.

A controller area network (CAN) communication protocol, for example, is used in an in-vehicle network. A building automation and control networking protocol (BACnet) (registered trademark) communication protocol, for example, is used in a building network. An ECHONET Lite (registered trademark) communication protocol, for example, is used in a home network (this network can also be phrased as an IoT device network). In this manner, dedicated, unique protocols are used in the respective networks, and security measures corresponding to the respective dedicated protocols are needed.

For example, Patent Literature 1 discloses a monitoring controlling device for an industrial control system, and this device is aimed to promptly detect an attack on the system perpetrated from the outside. The monitoring controlling device learns a control command sequence in advance and performs monitoring and analyzing. Thus, the monitoring controlling device quickly detects an attack targeting the monitoring controlling device and protects the system. The monitoring controlling device monitors a control signal sent to a target of the control and thus detects an attack on the system or detects an anomaly in a control device.

For example, Patent Literature 2 discloses a data determining device, a data determining method, and a program. In particular, Patent Literature 2 discloses a data determining device, a data determining method, and a program for detecting intrusion of an attack into a network. Patent Literature 2 provides a data determining device capable of detecting an attack that takes over a server that is permitted to carry out communication and has attack communication embedded in the communication defined as being normal.

From now on, it is not sufficient to take security measures within a single dedicated protocol, and security measures against a cyberattack perpetrated from one dedicated protocol across another dedicated protocol are needed.

For example, in one conceivable example of a cyberattack, a cyberattack may be perpetrated from an information technology (IT) network used in an office or the like against an operation technology (OT) network used representatively at a factory as well as against a vehicle network, a home network, or a building network. In this case, the attack on a target network is started at the timing when the IT network, the OT network, the vehicle network, the home network, or the building network has become capable of communication.

To be more specific, in this attack technique, in order to intrude into the building network, a program that attacks the vulnerability of BACnet (registered trademark), which is the dedicated protocol of the building network, is downloaded in advance onto a vehicle via an in-vehicle network. Then, conceivably, the attacker attacks the building network from the vehicle via the in-vehicle network upon the attacker moving the vehicle to connect to the building network.

In this manner, it is conceivable that a cyberattack is perpetrated across networks of a plurality of fields, such as a vehicle, a home, or a building.

The present disclosure provides a detection system that detects a cyberattack properly.

This detection system handles an input from networks of a plurality of fields, such as a vehicle, a home, or a building, and instead of operating independent anomaly detection systems for the respective fields, integrates an information detector and an information notifier of each anomaly detection system and properly detects a cyberattack perpetrated across the networks of the plurality of fields. This configuration makes it possible to prevent damage caused by a cyberattack.

A detection system according to one aspect of the present disclosure is a detection system that includes an obtainer that obtains a first log, the first log being a log of communication in a first network; a determiner that makes a determination as to whether the first log obtained by the obtainer includes anomaly information indicating anomalous communication in a second network; and a controller that performs control of notifying of an anomaly in the second network, when the determiner has determined that the first log includes the anomaly information.

According to the aspect above, the detection system determines whether the log of communication in the first network includes information that indicates anomalous communication in the second network and can thus detect a cyberattack perpetrated via the first network from the second network. In this manner, the detection system can properly detect a cyberattack perpetrated across a plurality of networks including the first network and the second network.

For example, the obtainer may obtain, as the first log, a log of a first frame, the first frame being a communication frame that flows in the first network; and the determiner may make the determination with use of, as the anomaly information, information indicating an anomaly in data included in the first frame.

According to the aspect above, the detection system can detect a cyberattack with use of information indicating an anomaly in data included in a communication frame that flows in the first network. Therefore, the detection system can properly detect a cyberattack perpetrated across a plurality of networks more easily.

For example, the information indicating the anomaly in the data may include information indicating that the first frame includes a second frame, the second frame being a communication frame that flows in the second network, the second frame having a frame format compliant with a communication protocol used in the second network, the second frame including, in a field of the second frame, data different from normal data used in the field.

According to the aspect above, the detection system detects a cyberattack by determining whether a first frame includes a second frame. Herein, the second frame is data that has a format of a frame flowing in the second network but includes improper data, and the second frame can be detected easily through a determination process performed on data included in the frame. Therefore, the detection system can properly detect a cyberattack perpetrated across a plurality of networks more easily.

For example, the controller may perform, as the control, control of displaying an image indicating an occurrence of the anomaly in the second network on a screen for notifying of an anomaly in the second network.

According to the aspect above, if the detection system has detected anomalous communication of the second network in the first network, the detection system displays, on a screen, an image informing of the anomalous communication in the second network. The anomalous communication in the second network may be caused by an occurrence of a cyberattack on the second network. In this case, it is more desirable to inform the person monitoring the second network than the person monitoring the first network of the occurrence of the anomalous communication in the second network, and the aforementioned screen display allows the person monitoring the second network to be informed of the occurrence of the anomalous communication. Therefore, the detection system can properly detect a cyberattack perpetrated across a plurality of networks and contribute to informing the person monitoring the network targeted by the cyberattack of an occurrence of the cyberattack.

For example, the obtainer may further obtain a second log, the second log being a log of communication in the second network; and the determiner may further determine whether the second log obtained by the obtainer includes anomaly information indicating anomalous communication in the first network, may include a common detector that performs a Denial of Service attack detection process or a signature-based intrusion detection process on each of the first log and the second log obtained by the obtainer, and may determine that the first log includes the anomaly information when the common detector has detected a Denial of Service attack in the Denial of Service attack detection process or when the common detector has detected unauthorized communication in the signature-based intrusion detection process, and that the second log includes the anomaly information when the common detector has detected a Denial of Service attack in the Denial of Service attack detection process or when the common detector has detected unauthorized communication in the signature-based intrusion detection process.

According to the aspect above, in the detection system, the common detector efficiently and collectively executes a detection process of detecting an attack that should be detected commonly in a plurality of networks (e.g., a Denial of Service attack detection process or a signature-based intrusion detection process). Therefore, the detection system can properly detect a cyberattack perpetrated across a plurality of networks more efficiently.

For example, the second network may include one or more second networks; and the determiner may include an individual detector provided for each of the one or more second networks, each individual detector performing an individual detection process of detecting anomalous communication in the second network based on the first log obtained by the obtainer, and may determine that the first log includes the anomaly information when the individual detector for the second network selected from the one or more second networks in accordance with contents of the first log has detected the anomalous communication in the individual detection process.

According to the aspect above, in the detection system, the individual detector provided for each of the plurality of networks individually executes a detection process of detecting an attack that should be detected individually in each of the plurality of networks. The individual detector performs an individual process corresponding to an attack that can be perpetrated in the network corresponding to the individual detector. In other words, the individual detector does not need to perform a process corresponding to an attack that is perpetrated in another network, not in the corresponding network. Therefore, the processing amount of the executed process can be reduced, which leads to improved efficiency. Furthermore, this may contribute to the reduction in the power consumption. Therefore, the detection system can properly detect a cyberattack perpetrated across a plurality of networks more efficiently.

For example, the first network may be one network selected from an in-vehicle network, a home network, and a building network; and the second network may include one or more of the in-vehicle network, the home network, or the building network and excludes the first network.

According to the aspect above, the detection system can properly detect a cyberattack perpetrated across a plurality of networks with possible targets being the in-vehicle network, the home network, and the building network.

For example, communication compliant with a controller area network (CAN) protocol may be performed in the in-vehicle network, communication compliant with an ECHONET Lite (registered trademark) protocol may be performed in the home network, and communication compliant with a BACnet (registered trademark) protocol may be performed in the building network.

According to the aspect above, the detection system can properly detect a cyberattack perpetrated across a plurality of networks with possible targets being the in-vehicle network in which the CAN protocol is used, the home network in which the ECHONET Lite (registered trademark) protocol is used, and the building network in which the BACnet (registered trademark) protocol is used.

For example, the controller may include association information indicating that the second network is associated with a user identical to a user associated with the first network; and when performing the control, the controller may identify the second network associated, in the association information, with a user identical to a user associated, in the association information, with the first network corresponding to the first log obtained by the obtainer, and may perform control of notifying of an anomaly in the second network identified.

According to the aspect above, the detection system can properly detect a cyberattack perpetrated across a plurality of networks with possible targets being the first network and the second network associated with the same user in the association information.

For example, when the first network or the second network is an in-vehicle network, the association information may include vehicle identification information, an IP address, or a phone number of a vehicle provided with the in-vehicle network; when the first network or the second network is a home network, the association information may include address information, an IP address, an email address, a phone number, or a facsimile number of a home provided with the home network; and when the first network or the second network is a building network, the association information may include address information, an IP address, an email address, a phone number, or a facsimile number of a building provided with the building network.

According to the aspect above, the detection system can properly detect a cyberattack perpetrated across a plurality of networks more easily by associating the in-vehicle network, the home network, and the building network with use of the identification information, the IP address, or the phone number of the vehicle or with use of the address information, the IP address, the email address, the phone number, or the facsimile number of the home or of the building.

It is to be noted that general or specific embodiments of the above may be implemented in the form of an apparatus, a method, an integrated circuit, a computer program, or a computer readable recording medium, such as a CD-ROM, or through any desired combination of an apparatus, a method, an integrated circuit, a computer program, and a recording medium.

Hereinafter, some embodiments will be described in concrete terms with reference to the drawings.

It is to be noted that the embodiments described below merely illustrate general or specific examples. The numerical values, the shapes, the materials, the constituent elements, the arrangement positions and the connection modes of the constituent elements, the steps, the orders of the steps, and so on illustrated in the following embodiments are examples and are not intended to limit the present invention. Among the constituent elements in the following embodiments, any constituent element that is not included in independent claims expressing the broadest concept is to be construed as an optional constituent element.

EMBODIMENT

According to the present embodiment, a detection system that properly detects a cyberattack perpetrated across a plurality of networks will be described.
<System Configuration>

The present embodiment will be described below with reference to the drawings.

FIG. 1 is a configuration diagram of integrated anomaly detection system 100 according to the present embodiment. In FIG. 1, integrated anomaly detection system 100 is an integrated system that collectively controls the vehicle security, the home security, or the building security. Integrated anomaly detection system 100 corresponds to a detection system.

Integrated anomaly detection system 100 includes, as functional units, information collector 110, information detector 120, and information notifier 130. These functional units included in integrated anomaly detection system 100 may be implemented as a processor (e.g., a central processing unit (CPU)) (not illustrated) executes a predetermined program with help of a memory (not illustrated).

Information collector 110 includes vehicle information collector 111, home information collector 112, and building information collector 113.

Information detector 120 includes common information detector 121, vehicle information detector 122, home information detector 123, building information detector 124, and integrated information detector 125. Vehicle information detector 122, home information detector 123, and building information detector 124 each correspond to an individual detector.

Information notifier 130 includes integrated information notifier 131, vehicle information notifier 132, home information notifier 133, building information notifier 134, and client information database 135.

Information collector 110 is a functional unit that collects a log that a device connected to a given network generates through communication. Information collector 110 transfers a collected log to information detector 120.

Vehicle information collector 111 collects a log that a device connected to an in-vehicle network generates through communication. In the example described herein, the communication protocol of the in-vehicle network is CAN. Alternatively, other protocols may be used. In the case of the example, the log that vehicle information collector 111 collects is a log of a frame having a frame format of the CAN communication protocol.

Home information collector 112 collects a log that a device connected to a home network generates through communication. In the example described herein, the communication protocol of the home network is ECHONET Lite (registered trademark). Alternatively, other communication protocols may be used. In the case of the example, the log that home information collector 112 collects is a log of a frame having a frame format of the ECHONET Lite (registered trademark) protocol.

Building information collector 113 collects a log that a device connected to a building network generates through communication. In the example described herein, the communication protocol of the building network is BACnet (registered trademark). Alternatively, other communication protocols may be used. In the case of the example, the log that home information collector 112 collects is a log of a frame having a frame format of, for example, the BACnet (registered trademark) protocol.

Herein, one network selected from the in-vehicle network, the home network, and the building network corresponds to a first network. Meanwhile, of the in-vehicle network, the home network, and the building network, a network or networks different from the first network correspond to a second network. For example, in a case in which the first network is the in-vehicle network, the second network may be any one of the home network, the building network, or another in-vehicle network different from the first network. The second network may include one or more second networks.

In addition, the communication log in the first network corresponds to a first log. In other words, one log selected from the log collected by vehicle information collector 111, the log collected by home information collector 112, and the log collected by building information collector 113 corresponds to the first log. Meanwhile, of the log collected by vehicle information collector 111, the log collected by home information collector 112, and the log collected by building information collector 113, a log or logs that are not the first log correspond to a second log.

Information detector 120 is a functional unit that monitors a log transferred from information collector 110 and detects any security anomaly. In other words, information detector 120 determines whether the first log that information collector 110 has obtained includes anomaly information that indicates anomalous communication in the second network. The anomaly information is, for example, information that indicates an anomaly in data included in a first frame.

The anomaly information may include information indicating that the first frame includes a second frame, which is a communication frame that flows in the second network. In this case, the second frame is a frame that has a frame format compliant with the communication protocol used in the second network and that includes, in a field included in the second frame, data different from normal data used in this field. In this example, in a case in which the aforementioned field is a field that includes a fixed value, the normal data used in this field is this fixed value. Meanwhile, in a case in which the aforementioned field is a field that can take only limited values, the normal data used in this field is one of these limited values.

Integrated information detector 125 plays a role of a dispatcher. With use of the log transferred from information collector 110, integrated information detector 125 performs inspection as to whether the communication data includes a frame having a frame format of the communication protocol that is used in any one of the vehicle field, the home field, and the building field. Then, in accordance with the result of this inspection, integrated information detector 125 performs control of determining to which one of common information detector 121, vehicle information detector 122, home information detector 123, and building information detector 124 integrated information detector 125 should make a detection request. Then, if any one of common information detector 121, vehicle information detector 122, home information detector 123, and building information detector 124 has detected an anomaly, information detector 120 determines that the aforementioned log includes anomaly information.

Specifically, integrated information detector 125 inspects the frame format of the communication protocol included in the log that information collector 110 has transferred to integrated information detector 125.

Then, if integrated information detector 125 has determined that the log that information collector 110 has transferred to integrated information detector 125 includes data that matches the frame format of the CAN communication protocol, integrated information detector 125 provides that log to vehicle information detector 122 and requests vehicle information detector 122 to perform anomaly detection.

Meanwhile, if integrated information detector 125 has determined that the log that information collector 110 has transferred to integrated information detector 125 includes data that matches the frame format of ECHONET Lite (registered trademark), integrated information detector 125 provides that log to home information detector 123 and requests home information detector 123 to perform anomaly detection.

Meanwhile, if integrated information detector 125 has determined that the log that information collector 110 has transferred to integrated information detector 125 includes data that matches the frame format of BACnet (registered trademark), integrated information detector 125 provides that log to building information detector 124 and requests building information detector 124 to perform anomaly detection.

If integrated information detector 125 has determined that the log that information collector 110 has transferred to integrated information detector 125 includes information indicating a possibility of a security anomaly, such as a Denial of Service attack, that is common among the vehicle network, the home network, and the building network, integrated information detector 125 provides this log to common information detector 121 and requests common information detector 121 to perform anomaly detection.

Moreover, integrated information detector 125 requests information notifier 130 to provide a notification of a security anomaly. This request for a notification may include information indicating whether any one of the vehicle, the home, and the building is a target of an attack as determined based on the detection result of common information detector 121, vehicle information detector 122, home information detector 123, or building information detector 124 (such information is also referred to as target information). Moreover, the request for a notification may include configuration information of filtering or the like to be added in order to prevent damage caused by malware or the like.

Common information detector 121 performs a process of detecting a security anomaly, such as a Denial of Service attack, that is common among the vehicle network, the home network, and the building network or a process of detecting a signature of a security attack that is common regardless of the field. Common information detector 121 is also referred to as a common detector.

Vehicle information detector 122 detects a security anomaly corresponding to the dedicated protocol used in the in-vehicle network.

Home information detector 123 detects a security anomaly corresponding to the dedicated protocol used in the home network.

Building information detector 124 detects a security anomaly corresponding to the dedicated protocol used in the building network.

Information notifier 130 is a functional unit that provides a notification of a warning concerning a security anomaly. In other words, if information detector 120 has determined that the first log includes anomaly information, information notifier 130 performs control of providing a notification of an anomaly in the second network. In one example of such control, information notifier 130 performs control of displaying an image indicating an occurrence of an anomaly in the second network on a screen (not illustrated) that is for providing a notification of an anomaly in the second network. In one conceivable example, this screen is a display screen of a monitoring device connected to the second network to monitor the second network and can be viewed by a person monitoring the second network.

Specifically, information notifier 130 receives a notification request from information detector 120 (i.e., from integrated information detector 125) and, based on the received notification request, information notifier 130 performs control of providing a notification of a warning concerning a security anomaly. Information notifier 130 includes client information database 135 having registered therein information regarding the vehicle, the home, or the building of the user who uses the anomaly detection system.

Client information database 135 includes association information that indicates a user identical to a user associated with the in-vehicle network, the home network, or the building network. In other words, the association information can be rephrased as association information indicating that the second network is associated with the same user with whom the first network is associated.

Integrated information notifier 131 inquires of client information database 135 and obtains information indicating a notification destination of a security anomaly (this information is also referred to as notification destination information). Integrated information notifier 131 identifies the second network that is associated, in the association information, with the user the same as the user associated, in the association information, with the first network in the first log that information collector 110 has collected, and integrated information notifier 131 performs control of providing a notification of an anomaly in the identified second network. With this control, the notification of the anomaly is displayed on the screen serving to provide a notification of an anomaly in the identified second network.

Vehicle information notifier 132 provides a notification to the vehicle in accordance with the notification destination information that information notifier 130 has obtained. Specifically, vehicle information notifier 132 transmits the notification information to the vehicle via an interface (e.g., Web API) serving to provide a notification to the vehicle and thus performs control of providing a notification to the user concerning the vehicle. With this control, the notification of the anomaly is displayed on the screen serving to provide a notification of an anomaly in the in-vehicle network.

Home information notifier 133 provides a notification to the home in accordance with the notification destination information that information notifier 130 has obtained. Specifically, home information notifier 133 transmits the notification information to the home via an interface (e.g., Web API) serving to provide a notification to the home and thus performs control of providing a notification to the user concerning the home. With this control, the notification of the anomaly is displayed on the screen serving to provide a notification of an anomaly in the home network.

Building information notifier 134 provides a notification to the building in accordance with the notification destination information that information notifier 130 has obtained. Specifically, building information notifier 134 transmits the notification information to the building via an interface (e.g., Web API) serving to provide a notification to the building and thus performs control of providing a notification to the user concerning the building. With this control, the notification of the anomaly is displayed on the screen serving to provide a notification of an anomaly in the building network.

Figure 2:
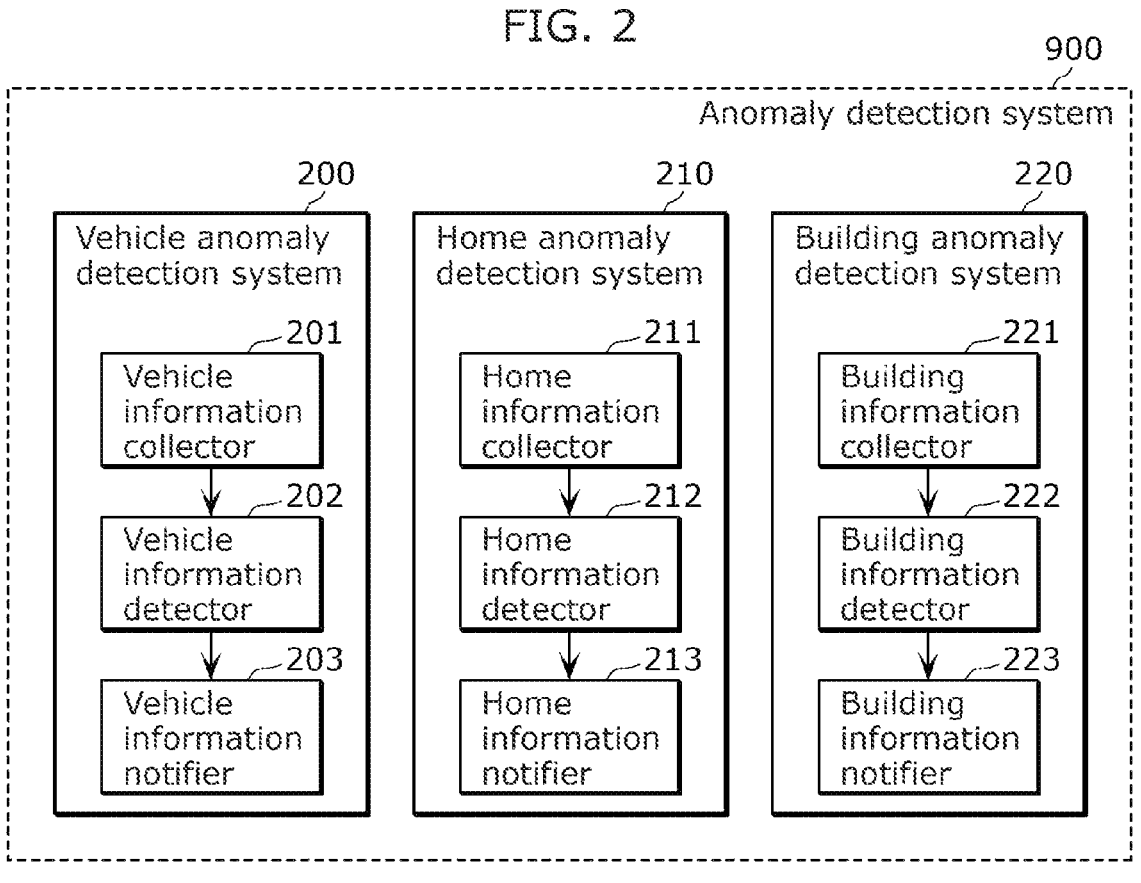
FIG. 2 is a block diagram illustrating a configuration of an anomaly detection system according to related art.

FIG. 2 is a block diagram illustrating a configuration of anomaly detection system 900 according to related art.

As illustrated in FIG. 2, anomaly detection system 900 according to related art includes vehicle anomaly detection system 200, home anomaly detection system 210, and building anomaly detection system 220.

Vehicle anomaly detection system 200, home anomaly detection system 210, and building anomaly detection system 220 are operated independently from one another for the respective network fields.

Specifically, vehicle anomaly detection system 200 includes vehicle information collector 201, vehicle information detector 202, and vehicle information notifier 203. Home anomaly detection system 210 includes home information collector 211, home information detector 212, and home information notifier 213. Building anomaly detection system 220 includes building information collector 221, building information detector 222, and building information notifier 223. In this manner, anomaly detection system 900 is operated as the anomaly detection systems in respective fields each include the information collector that collects a log generated through communication of the device in the corresponding field, the information detector that monitors the log generated through the stated communication and detects a security anomaly, and the information notifier that provides a notification of a security anomaly and as these anomaly detection systems are operated independently of one another in their respective fields.

In anomaly detection system 900, because of their structures, vehicle anomaly detection system 200, home anomaly detection system 210, and building anomaly detection system 220 are not capable of detecting a cyberattack perpetrated across the in-vehicle field, the home field, or the building field. Therefore, anomaly detection system 900 is not capable of providing a notification of a security anomaly concerning such a cyberattack.

Figure 3:
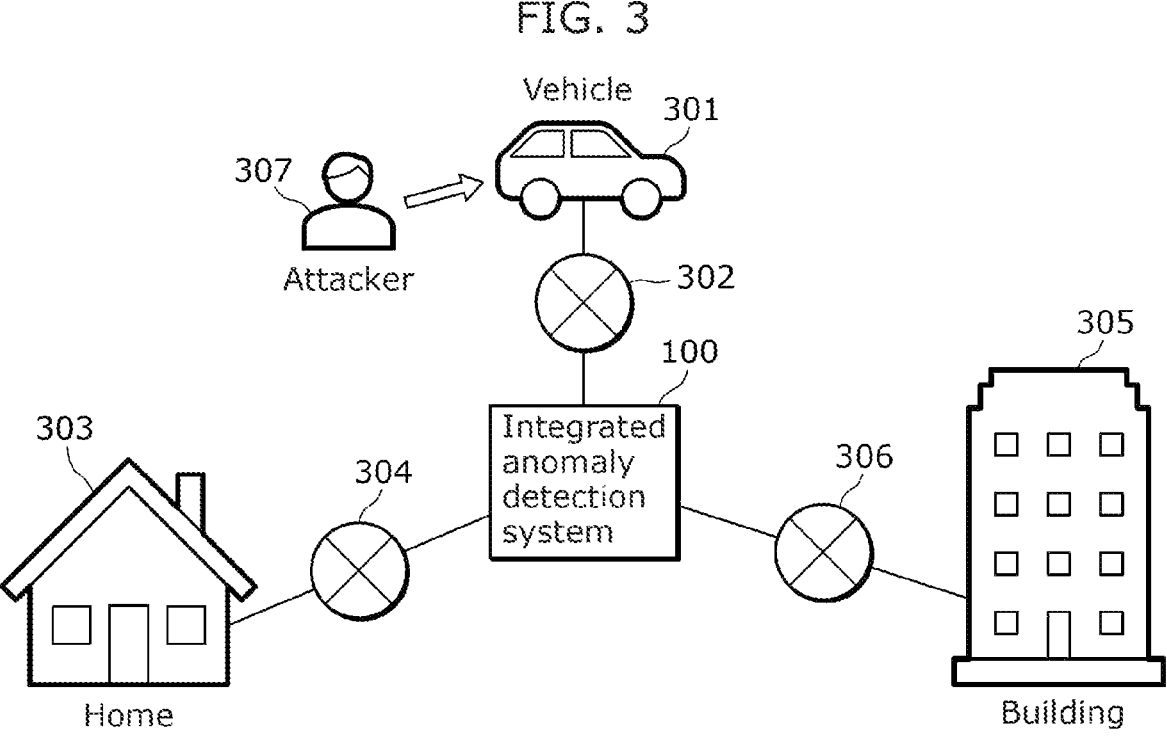

In the following section, a specific example will be described to illustrate an operation with which integrated anomaly detection system 100 according to the present embodiment detects an attack perpetrated by an attacker.
(1) Attack on Home Via Vehicle FIG. 3 is a first descriptive diagram illustrating a relationship among integrated anomaly detection system 100 according to the present embodiment, an in-vehicle network, and so on. Specifically, FIG. 3 shows integrated anomaly detection system 100, vehicle 301, home 303, and building 305. In addition, FIG. 3 shows attacker 307 who is to attack home 303 via vehicle 301.

As illustrated in FIG. 3, integrated anomaly detection system 100 is connected to vehicle 301 via network 302, connected to home 303 via network 304, and connected to building 305 via network 306. Vehicle 301, home 303, and building 305 are associated with one user in integrated anomaly detection system 100. One or more or all of networks 302, 304, and 306 may be connected to integrated anomaly detection system 100.

In one conceivable case, in order to intrude into the home network of home 303, attacker 307 may download, onto vehicle 301, a program (malware) that attacks the vulnerability of ECHONET Lite (registered trademark). In this case, integrated anomaly detection system 100 collects, via network 302, the log generated through the communication of vehicle 301 and analyzes the collected log.

Specifically, in integrated anomaly detection system 100, vehicle information collector 111 collects the log and transfers the collected log to information detector 120. In information detector 120, integrated information detector 125 inspects the communication data with use of the log and may detect, within the log, data that matches the contents of the frame format of CAN and may detect, in the payload of the frame format of CAN, data that matches the contents of the frame format of ECHONET Lite (registered trademark).

Based on the result of this detection, integrated information detector 125 makes a detection request to vehicle information detector 122 and home information detector 123. Specifically, integrated information detector 125 provides the log that includes the data that matches the contents of the frame format of CAN to vehicle information detector 122 and makes a detection request to vehicle information detector 122. In addition, integrated information detector 125 provides the log that includes, in the payload of the frame format of CAN, the data that matches the contents of the frame format of ECHONET Lite (registered trademark) to home information detector 123 and makes a detection request to home information detector 123.

Vehicle information detector 122 performs detection of a security anomaly in the data that matches the contents of the frame format of CAN and returns the detection result indicating that no anomaly has been detected to integrated information detector 125.

Home information detector 123 detects the fact that the data, in the payload of the frame format of CAN, that matches the contents of the frame format of ECHONET Lite (registered trademark) is the data traceable to the malware attacking the vulnerability of ECHONET Lite (registered trademark) and returns this detection result to integrated information detector 125.

Integrated information detector 125 receives the detection result from vehicle information detector 122 and the detection result from home information detector 123 and transmits a request for a notification of a security anomaly directed to home 303 to information notifier 130.

In information notifier 130, integrated information notifier 131 inquires of client information database 135 and obtains, as notification destination information, information indicating the notification destination from client information database 135.

Integrated information notifier 131 selects, from the obtained notification destination information, an item of information identifying home 303 as the notification destination and determines the contents of a security warning.

Integrated information notifier 131 makes a notification request to home information notifier 133. Home information notifier 133 sends a notification indicating the contents of configuration, such as filtering, to be made in the home network to home 303 serving as the notification destination indicated in the notification destination information that home information notifier 133 has obtained from client information database 135.

Home 303 receives a notification of a security warning from integrated anomaly detection system 100 via network 304. In response to receiving the notification of the security warning, home 303 sets the configuration, such as filtering, to the network of home 303 in accordance with the contents of the received warning.

Thereafter, vehicle 301 travels toward home 303 and connects to the home network of home 303. At this point, the malware that attacker 307 has downloaded onto vehicle 301 tries to intrude into the home network of home 303. This intrusion, however, is prevented by the filtering in the home network of home 303 configured as described above.

In this manner, integrated anomaly detection system 100 can prevent an attack on home 303 to be perpetrated by the malware that attacker 307 has downloaded onto vehicle 301.

(2) Attack on Building Via Vehicle

Figure 4:
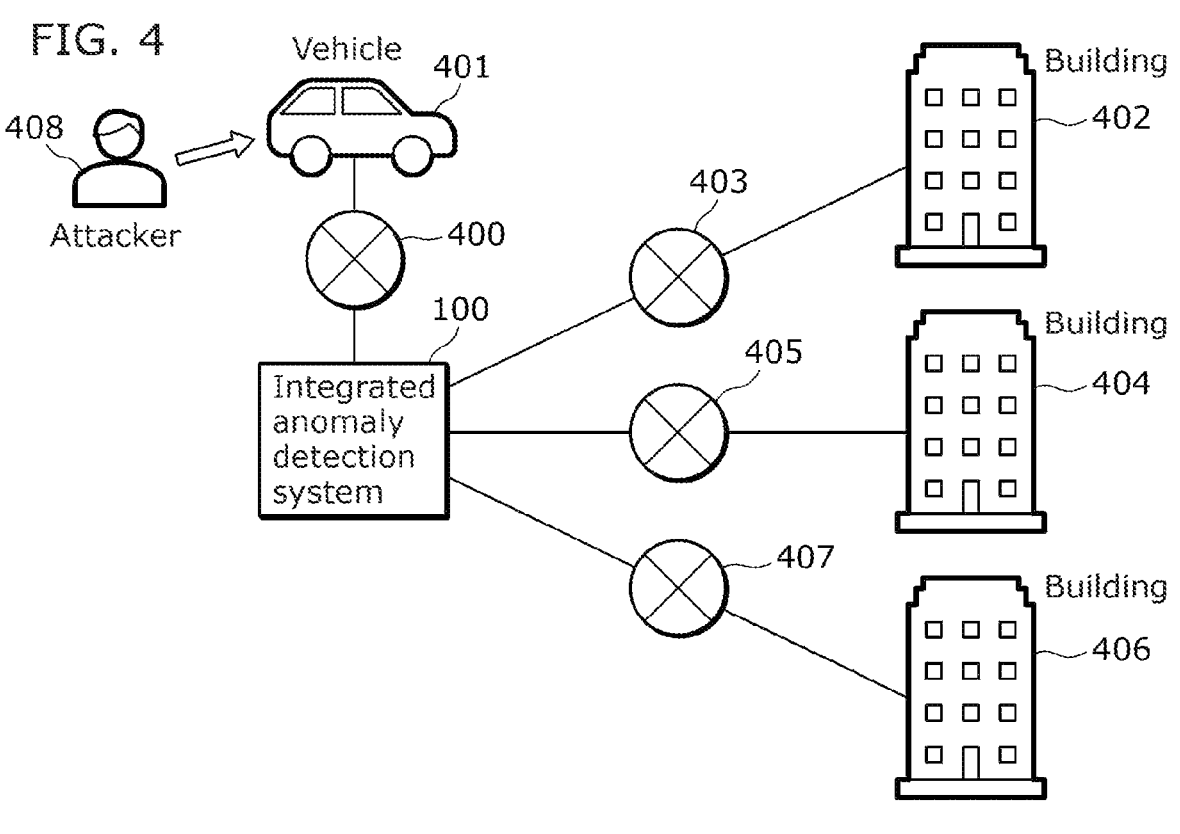

FIG. 4 is a second descriptive diagram illustrating a relationship among integrated anomaly detection system 100 according to the present embodiment, an in-vehicle network, and so on. FIG. 4 shows integrated anomaly detection system 100, vehicle 401, and buildings 402, 404, and 406. In addition, FIG. 4 shows attacker 408 who is trying to attack any one of buildings 402, 404, and 406 via vehicle 401.

As illustrated in FIG. 4, integrated anomaly detection system 100 is connected to vehicle 401 via network 400, connected to building 402 via network 403, connected to building 404 via network 405, and connected to building 406 via network 407. Vehicle 401, building 402, building 404, and building 406 are associated with one user in integrated anomaly detection system 100. One or more or all of networks 400, 403, 405, and 407 may be connected to integrated anomaly detection system 100.

In one conceivable case, in order to intrude into the building network of building 402, 404, or 406, attacker 408 may download, onto vehicle 401, a program (malware) that attacks the vulnerability of BACnet (registered trademark). In this case, integrated anomaly detection system 100 collects, via network 400, the log generated through the communication of vehicle 401 and analyzes the collected log.

Specifically, in integrated anomaly detection system 100, vehicle information collector 111 collects the log and transfers the collected log to information detector 120.

In information detector 120, integrated information detector 125 inspects the communication data with use of the log and may detect, within the log, data that matches the contents of the frame format of CAN and may detect, in the payload of the frame format of CAN, data that matches the contents of the frame format of BACnet (registered trademark).

Based on the result of this detection, integrated information detector 125 makes a detection request to vehicle information detector 122 and building information detector 124. Specifically, integrated information detector 125 provides the log that includes the data that matches the contents of the frame format of CAN to vehicle information detector 122 and makes a detection request to vehicle information detector 122. In addition, integrated information detector 125 provides the log that includes, in the payload of the frame format of CAN, the data that matches the contents of the frame format of BACnet (registered trademark) to building information detector 124 and makes a detection request to building information detector 124.

Vehicle information detector 122 performs detection of a security anomaly in the data that matches the contents of the frame format of CAN and returns the detection result indicating that no anomaly has been detected to integrated information detector 125.

Building information detector 124 detects the fact that the data, in the payload of the frame format of CAN, that matches the contents of the frame format of BACnet (registered trademark) is the data traceable to the malware attacking the vulnerability of BACnet (registered trademark) and returns this detection result to integrated information detector 125.

Integrated information detector 125 receives the detection result from vehicle information detector 122 and the detection result from building information detector 124 and transmits a request for a notification of a security anomaly directed to the building to information notifier 130.

In information notifier 130, integrated information notifier 131 inquires of client information database 135 and obtains, as notification destination information, information indicating the notification destination from client information database 135.

Integrated information notifier 131 selects, from the obtained notification destination information, an item of information identifying the building as the notification destination and determines the contents of a security warning.

Integrated information notifier 131 makes a notification request to building information notifier 134. Building information notifier 134 sends a notification indicating the contents of configuration, such as filtering, to be made in the building network to building 402, building 404, and building 406 each serving as the notification destination indicated in the notification destination information that building information notifier 134 has obtained from client information database 135.

Building 402, building 404, and building 406 each receive a notification of a security warning from integrated anomaly detection system 100 via, respectively, network 403, network 405, and network 407. In response to receiving the notification of the security warning, building 402, building 404, and building 406 each set the configuration, such as filtering, to the respective building networks in accordance with the contents of the received warning.

Thereafter, vehicle 401 travels toward any one of building 402, building 404, and building 406 and connects to the building network of building 402, building 404, or building 406. At this point, the malware that attacker 408 has downloaded onto vehicle 401 tries to intrude into the building network of building 402, building 404, or building 406. This intrusion, however, is prevented by the filtering in the building network configured as described above.

In this manner, integrated anomaly detection system 100 can prevent an attack on building 402, building 404, and building 406 to be perpetrated by the malware that attacker 408 has downloaded onto vehicle 401.

(3) Attack on Building Via Home and Vehicle

Figure 5:
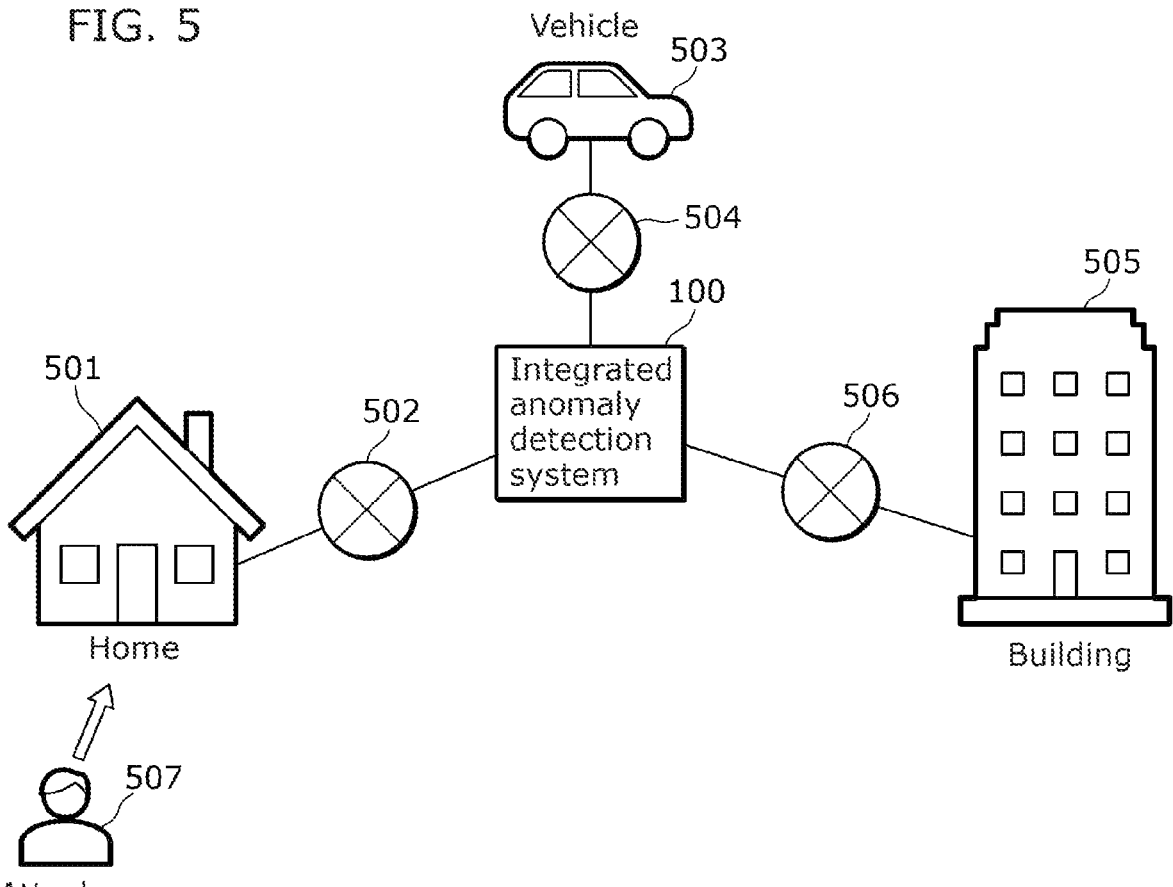

FIG. 5 is a third descriptive diagram illustrating a relationship among integrated anomaly detection system 100 according to the present embodiment, an in-vehicle network, and so on. FIG. 5 shows integrated anomaly detection system 100, home 501, vehicle 503, and building 505. In addition, FIG. 5 shows attacker 507 who is trying to attack building 505 via home 501. One or more or all of networks 502, 504, and 506 may be connected to integrated anomaly detection system 100.

As illustrated in FIG. 5, integrated anomaly detection system 100 is connected to home 501 via network 502, connected to vehicle 503 via network 504, and connected to building 505 via network 506. Home 501, vehicle 503, and building 505 are associated with one user in integrated anomaly detection system 100.

In one conceivable case, in order to intrude into the building network of building 505, attacker 507 may download, onto home 501, a program (malware) that attacks the vulnerability of BACnet (registered trademark). In this case, integrated anomaly detection system 100 collects, via network 502, the log generated through the communication of home 501 and analyzes the collected log.

Specifically, in integrated anomaly detection system 100, home information collector 112 collects the log and transfers the collected log to information detector 120.

In information detector 120, integrated information detector 125 inspects the communication data with use of the log and may detect, within the log, data that matches the contents of the frame format of ECHONET Lite (registered trademark) and may detect, in the payload of the frame format of ECHONET Lite (registered trademark), data that matches the contents of the frame format of BACnet (registered trademark).

Based on the result of this detection, integrated information detector 125 makes a detection request to home information detector 123 and building information detector 124. Specifically, integrated information detector 125 provides the log that includes the data that matches the contents of the frame format of ECHONET Lite (registered trademark) to home information detector 123 and makes a detection request to home information detector 123. In addition, integrated information detector 125 provides the log that includes, in the payload of the frame format of ECHONET Lite (registered trademark), the data that matches the contents of the frame format of BACnet (registered trademark) to building information detector 124 and makes a detection request to building information detector 124.

Home information detector 123 performs detection of a security anomaly in the data that matches the contents of the frame format of ECHONET Lite (registered trademark) and returns the detection result indicating that no anomaly has been detected to integrated information detector 125.

Building information detector 124 detects the fact that the data, in the payload of the frame format of ECHONET Lite (registered trademark), that matches the contents of the frame format of BACnet (registered trademark) is the data traceable to the malware attacking the vulnerability of BACnet (registered trademark) and returns this detection result to integrated information detector 125.

Integrated information detector 125 receives the detection result from home information detector 123 and the detection result from building information detector 124 and transmits a request for a notification of a security anomaly directed to the building to information notifier 130.

In information notifier 130, integrated information notifier 131 inquires of client information database 135 and obtains, as notification destination information, information indicating the notification destination from client information database 135.

Integrated information notifier 131 selects, from the obtained notification destination information, an item of information identifying the building as the notification destination and determines the contents of a security warning.

Integrated information notifier 131 makes a notification request to building information notifier 134. Building information notifier 134 sends a notification indicating the contents of configuration, such as filtering, to be made in the building network to building 505 serving as the notification destination indicated in the notification destination information that building information notifier 134 has obtained from client information database 135.

Building 505 receives a notification of a security warning from integrated anomaly detection system 100 via network 506. In response to receiving the notification of the security warning, building 505 sets the configuration, such as filtering, to the building network in accordance with the contents of the received warning.

Thereafter, upon vehicle 503 becoming connected to the home network of home 501, vehicle 503 may download the program (the malware) that attacker 507 has downloaded to home 501 onto vehicle 503. Thereafter, vehicle 503 travels toward building 505, and upon vehicle 503 becoming connected to the building network of building 505, the malware that attacker 507 has downloaded onto vehicle 503 via home 501 tries to intrude into the building network of building 505. This intrusion, however, is prevented by the filtering in the building network configured as described above.

In this manner, integrated anomaly detection system 100 can prevent an attack on building 505 to be perpetrated by the malware that attacker 507 has downloaded onto vehicle 503 via home 501.

FIG. 6 is a descriptive diagram illustrating a structure of client information database 135 according to the present embodiment.

Client information database 135 includes the association information shown in (a) in FIG. 6. The association information is information that associates, for each client, the client number that uniquely identifies the client, the vehicle registration number that uniquely identifies the vehicle associated with the client, the home registration number that uniquely identifies the home associated with the client, and the building registration number that uniquely identifies the building associated with the client.

In this example, in a case in which there are a plurality of vehicles, homes, or buildings that are to be associated with a client, a plurality of vehicle registration numbers, a plurality of home registration numbers, or a plurality of building registration numbers are associated with one client in client information database 135.

For example, (a) in FIG. 6 shows that the vehicle with the vehicle registration number of C00001, the home with the home registration number of H00001, and the building with the building registration number of 600001 are associated with the client with the client registration number of 00001.

Moreover, client information database 135 includes the vehicle detail information shown in (b) in FIG. 6. The vehicle detail information is information that associates, for each vehicle, the vehicle registration number with the vehicle identification number of the vehicle, an IP address, a phone number, or the like that serves as information indicating the notification destination to which a notification for the vehicle is sent concerning a warning of a security anomaly.

For example, (b) in FIG. 6 shows that the vehicle identification number "Shinagawa 599 ra NN-MM", the IP address "210.160. XXX.XXX", and the phone number "090-5432-XXXX" are associated with the vehicle with the vehicle registration number of C00001.

Moreover, client information database 135 includes the building detail information shown in (c) in FIG. 6. The building detail information is information that associates, for each building, the building registration number with an address, an IP address, an email address, a phone number, a facsimile (FAX) number, or the like that serves as information indicating the notification destination to which a notification for the building is sent concerning a warning of a security anomaly.

For example, (c) in FIG. 6 shows that the address "A-B-C Ginza, Chuo-ku, Tokyo", the IP address "60.66. XXX.XXX", the email address "admin@example.com", the phone number "03-5148-XXXX", and the FAX number "03-5148-XXXX" are associated with the vehicle with the building registration number of B00001.

In this example, client information database 135 may further include home detail information (not illustrated). Like the building detail information described above, the home detail information is information that associates, for each home, the home registration number with an address, an IP address, an email address, a phone number, a facsimile (FAX) number, or the like that serves as information indicating the notification destination to which a notification for the home is sent concerning a warning of a security anomaly.

It suffices that, in a case in which the first network or the second network is an in-vehicle network, client information database 135, or in other words the association information, include the identification information of the vehicle provided with the in-vehicle network. Meanwhile, it suffices that, in a case in which the first network or the second network is a home network, client information database 135, or in other words the association information, include the address information of the home provided with the home network. Meanwhile, it suffices that, in a case in which the first network or the second network is a building network, client information database 135, or in other words the association information, include the address information of the building provided with the building network.

Integrated information notifier 131 can obtain information that allows integrated information notifier 131 to provide a notification of a warning concerning a security anomaly to all the vehicles, homes, and buildings associated with a given client, based on the client number identifying that client and the type of the vehicle, the home, or the building.

FIG. 7 is a descriptive diagram illustrating a frame format of ECHONET Lite (registered trademark).

As illustrated in (a) in FIG. 7, a frame of ECHONET Lite (registered trademark) includes the following fields: the message header (EHD1, EHD 2), the transaction ID (TID), the source object specification (SEOJ), the destination object specification (DEOJ), the service code (ESV), the number of processing properties (OPC), the property number (EPC), the byte count of property data (PDC), and the property data (EDT).

These fields include a field that includes a fixed value or a field that can take only limited values.

For example, the message header (EHD1, EHD 2) is a field that includes a fixed value.

For example, the transaction ID (TID) is a field that often takes 0x0000. The number of processing properties (OPC) is a field that takes 0x01 most of the time.

When the contents of a field that includes a fixed value or the contents of a field that can take only limited values are included in given log data, vehicle information detector 122 can determine that the log data includes a frame of ECHONET Lite (registered trademark).

FIG. 8 is a descriptive diagram illustrating a frame format of BACnet.

As illustrated in (a) in FIG. 8, FIG. 8 is a descriptive diagram illustrating a frame format of BACnet. A frame of BACnet is composed of a BACnet virtual link layer (BVLL) header, a BACnet header, and a BACnet application protocol unit (APDU), and the BVLL header includes the following fields: the BACnet virtual link control (BVLC) type, the BVLC function, and the BVLC length. The BACnet header includes the version field and the control field.

These fields include a field that includes a fixed value or a field that can take only limited values.

For example, the BVLC type field of the BVLL header and the version field of the BACnet header are each a field that includes a fixed value.

For example, the BVLC function field of the BVLL header and the control field of the BACnet header are each a field that can take only limited values.

When the contents of a field that includes a fixed value or the contents of a field that can take only limited values are included in given log data, building information detector 124 can determine that the log data includes a frame of BACnet.

FIG. 9 is a descriptive diagram illustrating a log according to the present embodiment. The log illustrated in FIG. 9 shows an example of a log that information collector 110 (i.e., vehicle information collector 111, home information collector 112, or building information collector 113) collects. Each row shown in FIG. 9 corresponds to one entry in the log. One entry corresponds to one frame (a frame of CAN, a frame of ECHONET Lite (registered trademark), or a frame of BACnet (registered trademark)).

As illustrated in FIG. 9, one entry includes time information, header information, and payload information.

The time information is information that indicates the time at which the frame for this entry has been received (time information T1, T2 indicated in FIG. 9). The time information is information that indicates the time at which the frame for this entry has been received, for example, in the format of hour:minute:second. Specifically, the time information is information shown in the form of "2021/1/1 12:12:12".

The header information is information that indicates the header (see FIG. 7 or FIG. 8) of the frame for this entry (header information H1, H2 indicated in FIG. 9). The header information may be a value read out from one or more fields included in the header of the frame or from all the fields included in the header of the frame or may include the binary data itself of the header.

The payload information is information that indicates the payload of the frame for this entry (this payload is the data included in this frame and located after the header) (see FIG. 7 or FIG. 8) (payload information P1, P2 indicated in FIG. 9). The payload information may be a value read out from one or more fields included in the payload or from all the fields included in the payload or may include the binary data itself of the payload. For example, the payload information may be data extracted from the head of the payload by a predetermined number of bytes.

<Flowchart of Process>

A process of integrated anomaly detection system 100 configured as described above will be described.

Figure 10:
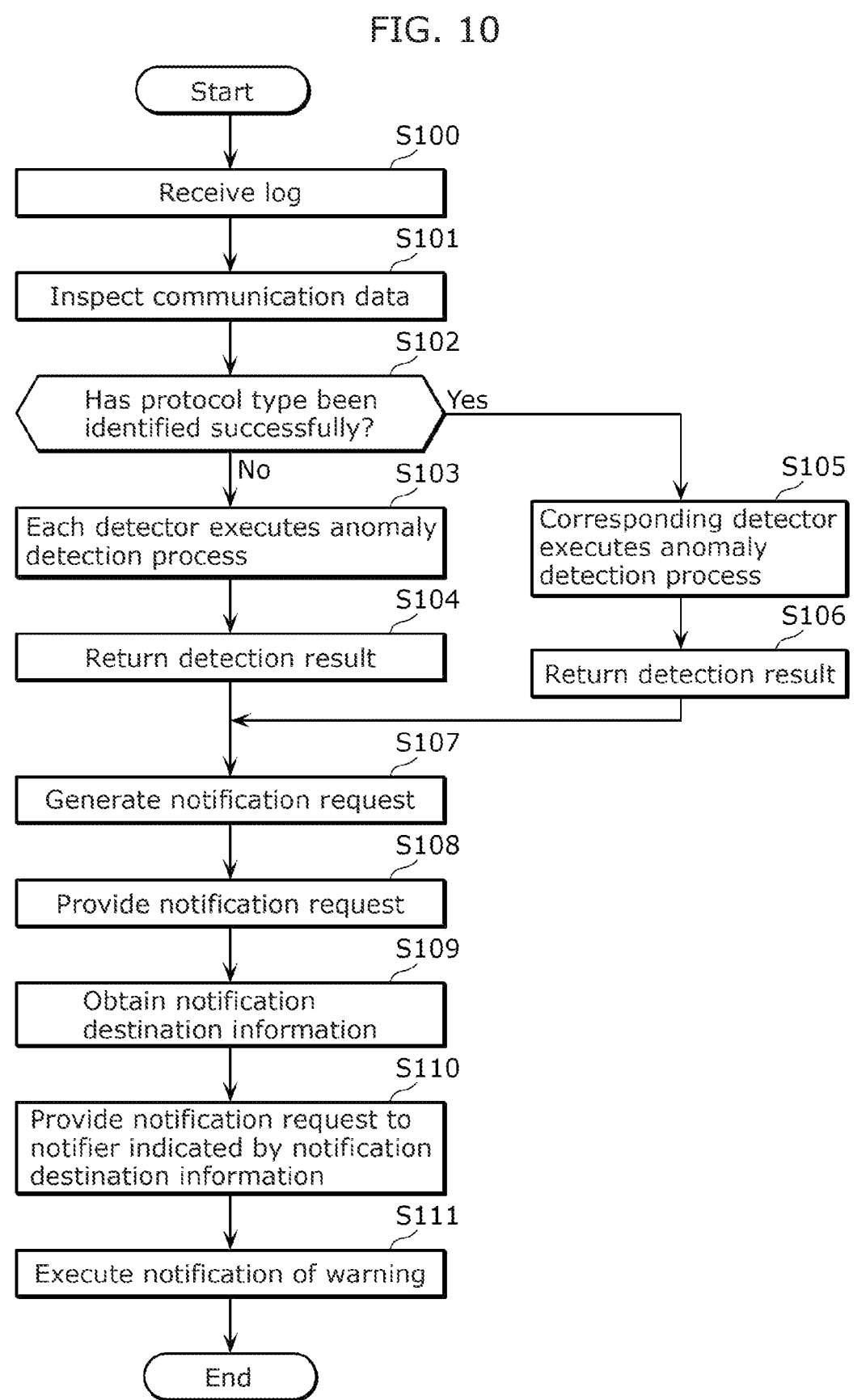
FIG. 10 is a flowchart illustrating a process of an integrated anomaly detection system according to an embodiment.

FIG. 10 is a flowchart illustrating a process of integrated anomaly detection system 100 according to the present embodiment.

The process shown in FIG. 10 is a process in which integrated anomaly detection system 100 collects a log that a vehicle, a home, or a building generates through communication, detects a security anomaly, and notifies the vehicle, the home, or the building of the detected anomaly.

At step S100, information collector 110 (i.e., vehicle information collector 111, home information collector 112, and building information collector 113) receives a log indicating communication data.

At step S101, integrated information detector 125 inspects the communication data with use of the log that information collector 110 has received at step S100.

At step S102, integrated information detector 125 tries to identify the protocol of the communication data based on the result of the inspection at step S101. If integrated information detector 125 has successfully identified the protocol of the communication data (Yes at step S102), integrated information detector 125 performs the process of step S105. Meanwhile, if integrated information detector 125 has failed to identify the protocol of the communication data (No at step S102), integrated information detector 125 performs the process of step S103.

At step S103, integrated information detector 125 provides the log to each one of all the detectors (i.e., common information detector 121, vehicle information detector 122, home information detector 123, and building information detector 124, hereinafter the same) and thus requests these detectors to detect any anomaly in the communication data. In response to the request, each one of these detectors executes an anomaly detecting process of detecting an anomaly in the communication data with use of the received log.

At step S104, each one of these detectors returns the result of the anomaly detecting process executed at step S103 to integrated information detector 125. Upon the end of step S104, step S107 is executed.

At step S105, integrated information detector 125 provides the log to, among all the detectors, the detector that corresponds to the protocol of the communication data and thus requests this detector to detect any anomaly in the communication data. At this point, integrated information detector 125 refrains from providing the log to all the other detectors, excluding the detector that corresponds to the protocol of the communication data. In response to the request, the detector that corresponds to the protocol of the communication data executes an anomaly detecting process of detecting an anomaly in the communication data with use of the received log.

At step S106, the detector that has executed the anomaly detecting process at step S105 returns the result of the anomaly detecting process executed at step S105 to integrated information detector 125.

At step S107, integrated information detector 125 generates a notification request for a security anomaly based on the result of the detection returned at step S104 or returned at step S106. As described above, the notification request includes target information and configuration information.

At step S108, integrated information detector 125 provides the notification request generated at step S107 to integrated information notifier 131. Integrated information notifier 131 obtains the provided notification request.

At step S109, integrated information notifier 131 searches client information database 135 with use of the target information included in the notification request that integrated information notifier 131 has obtained at step S108 and obtains notification destination information.

At step S110, integrated information notifier 131 provides the notification request to, among vehicle information notifier 132, home information notifier 133, and building information notifier 134, the notifier indicated by the notification destination information obtained at step S109.

At step S111, of vehicle information notifier 132, home information notifier 133, and building information notifier 134, the notifier that has received the notification request at step S110 provides a notification to the vehicle, the home, or the building serving as the notification destination concerning a security warning.

Advantageous Effects of Embodiment

According to the embodiment, instead of operating separate anomaly detection systems for the vehicle field, the home field, and the building field, information detectors of the respective fields and information notifiers of the respective fields are each integrated with one another, and the integrated information detector identifies which one of the information detectors needs to perform detection based on a communication log that an information collector has collected.

This configuration makes it possible to detect a cyberattack perpetrated across the vehicle field, the home field, and the building field within the time comparative to the time required in the case of anomaly detection systems operated independently of one another in separated fields. The configuration above also makes it possible to prevent damage before it happens and to detect a security anomaly promptly and efficiently.

Variation of Embodiment

According to the present variation, another configuration of a detection system that properly detects a cyberattack perpetrated across a plurality of networks will be described.

Figure 11:
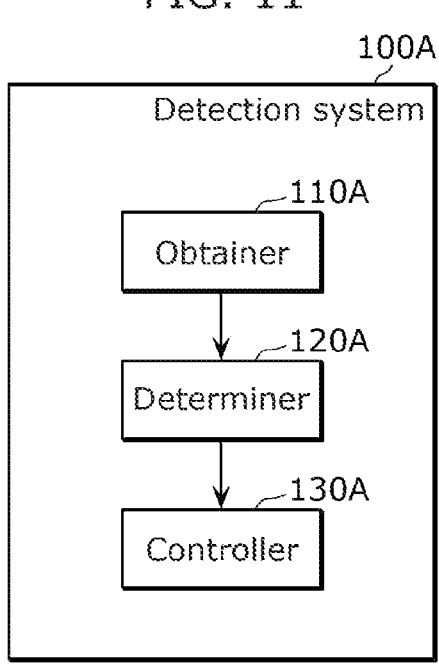
FIG. 11 is a block diagram illustrating a configuration of a detection system according to a variation of an embodiment.

FIG. 11 is a block diagram illustrating a configuration of detection system 100A according to the present variation.

As illustrated in FIG. 11, detection system 100A includes, as functional units, obtainer 110A, determiner 120A, and controller 130A. The functional units included in detection system 100A may be implemented as a processor (e.g., a CPU) (not illustrated) included in detection system 100A executes a program with help of a memory (not illustrated).

Obtainer 110A obtains a first log, which is a log of communication in a first network.

Determiner 120A determines whether the first log that obtainer 110A has obtained includes anomaly information that indicates anomalous communication in a second network.

If determiner 120A has determined that the first log includes anomaly information, controller 130A performs control of providing a notification concerning the anomaly in the second network.

In this example, obtainer 110A corresponds to information collector 110 according to the embodiment. More specifically, obtainer 110A corresponds to one selected from vehicle information collector 111, home information collector 112, and building information collector 113. Furthermore, the first network may be an in-vehicle network when obtainer 110A is vehicle information collector 111, may be a home network when obtainer 110A is home information collector 112, or may be a building network when obtainer 110A is building information collector 113.

Determiner 120A corresponds to information detector 120 according to the embodiment. The second network may be, of the in-vehicle network, the home network, and the building network, a network different from the first network. For example, in a case in which the first network is the in-vehicle network, the second network may be any one of the home network, the building network, or another in-vehicle network different from the first network.

Controller 130A corresponds to information notifier 130 according to the embodiment.

For example, obtainer 110A may obtain, as the first log, a log of a first frame, which is a communication frame that flows in the first network. In this case, determiner 120A may make a determination with use of, as anomaly information, information that indicates an anomaly in data included in the first frame.

For example, the aforementioned information that indicates an anomaly in the data may include information that indicates that the first frame includes a second frame, which is a communication frame that flows in the second network. In this case, the second frame may be a frame that has a frame format compliant with the communication protocol used in the second network and that includes, in a field included in the second frame, data different from normal data used in this field.

For example, controller 130A may perform, as the aforementioned control, control of displaying an image that indicates an occurrence of an anomaly in the second network on a screen provided for notifying an anomaly in the second network.

For example, obtainer 110A may further obtain a second log, which is a log of communication in the second network. In this case, determiner 120A may further determine whether the second log that obtainer 110A has obtained includes anomaly information that indicate anomalous communication in the first network. Moreover, determiner 120A may further include a common detector that performs a Denial of Service attack detection process or a signature-based intrusion detection process on each of the first log and the second log that obtainer 110A has obtained, and determiner 120A may determine that the log includes anomaly information if the common detector has detected a Denial of Service attack in the Denial of Service attack detection process or if the common detector has detected unauthorized communication in the signature-based intrusion detection process.

For example, the second network may include one or more second networks. Then, determiner 120A may include an individual detector provided for each of the one or more second networks, and each individual detector may perform an individual detection process of detecting anomalous communication in the second network based on the first log that obtainer 110A has obtained, and determiner 120A may determine that the first log includes anomaly information if the individual detector of the second network selected from the one or more second networks in accordance with the contents of the log has detected anomalous communication in the individual detection process.

For example, the first network may be one network selected from the in-vehicle network, the home network, and the building network. Meanwhile, the second network may include one or more each of the in-vehicle network, the home network, or the building network and may not include the first network.

For example, communication compliant with the controller area network (CAN) protocol may be carried out in the in-vehicle network, communication compliant with the ECHONET Lite (registered trademark) protocol may be carried out in the home network, and communication compliant with the BACnet (registered trademark) protocol may be carried out in the building network.

For example, controller 130A may include association information indicating that the second network is associated with the same user with whom the first network is associated. In this case, when performing the control, controller 130A performs control of identifying the second network that is associated, in the association information, with the user the same as the user associated, in the association information, with the first network related to the first log that obtainer 110A has collected, and controller 130A performs control of providing a notification of an anomaly in the identified second network.

For example, the association information may include identification information of the vehicle provided with the in-vehicle network when the first network or the second network is the in-vehicle network, may include address information of the home provided with the home network when the first network or the second network is the home network, or may include address information of the building provided with the building network when the first network or the second network is the building network.

Figure 12:
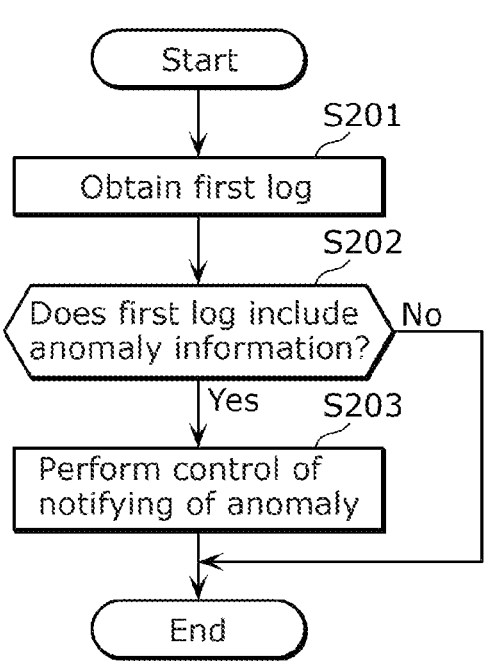
FIG. 12 is a flowchart illustrating a process of a detection system according to a variation of an embodiment.

FIG. 12 is a flowchart illustrating a process of detection system 100A according to the present variation.

As illustrated in FIG. 12, at step S201, detection system 100A (obtainer 110A) obtains a first log, which is a log of communication in a first network.

At step S202, detection system 100A (determiner 120A) determines whether the obtained first log includes anomaly information that indicates anomalous communication in a second network.

At step S203, if detection system 100A (controller 130A) has determined that the first log includes anomaly information, detection system 100A (controller 130A) performs control of providing a notification concerning the anomaly in the second network.

With this operation, detection system 100A properly detects a cyberattack perpetrated across a plurality of networks.

Other Variations

The present invention has been described based on the foregoing embodiments. It is needless to say, however, that the present invention is not limited to the foregoing embodiments. The cases such as the following are also encompassed by the present invention.

(1) According to the foregoing embodiments, the anomaly detection system works on a vehicle, a home, or a building. This, however, is merely one aspect of the anomaly detection system according to the present invention, and the detection may be performed not only on these three types: a vehicle, a home, and a building but also on another network field, such as a factory, where a dedicated protocol, such as Modbus, is used.

(2) According to the foregoing embodiments, the information notifier of the anomaly detection system provides a notification of a warning to, of the vehicle, the home, and the building, the home or the building targeted by a cyberattack at the end. Alternatively, the information notifier of the detection system may provide a notification of a warning to the vehicle holding the program (the malware) that executes the attack.

(3) According to the foregoing embodiments, the information notifier of the anomaly detection system provides a notification of a warning to the vehicle, the home, or the building to prevent a cyberattack. Herein, the filtering information serving as the contents of such a notification of a warning may be information concerning the vehicle serving as the source of the attack or may be information concerning the program (the malware) containing the contents of the attack.

(4) In one example according to the foregoing embodiments, the client information database of the anomaly detection system includes the vehicle identification number of the vehicle, the IP address, or the phone number as the registration information of the vehicle. Alternatively, any other identification information may be used as long as such identification information can be used to identify the vehicle or used as the notification destination.

(5) In one example according to the foregoing embodiments, the client information database of the anomaly detection system includes the address, the IP address, the email address, the phone number, or the FAX number as the registration information of the home or of the building. Alternatively, any other identification information may be used as long as such identification information can be used to identify the home or the building or used as the notification destination.

(6) According to the foregoing embodiments, the information notifier of the anomaly detection system notifies the vehicle, the home, and the building of a security anomaly through Web API. Herein, the format used in the notification through Web API may be written in any language, including a data description language such as JavaScript (registered trademark) Object Notation (JSON) or a markup language such as Extensible Markup Language (XML), or a communication scheme other than Web API, such as electronic mail, may also be used.

(7) In one example according to the foregoing embodiments, CAN is used as the communication protocol in the in-vehicle network. Alternatively, any other in-vehicle communication protocol, such as in-vehicle Ethernet, may be used.

(8) In one example according to the foregoing embodiments, ECHONET Lite (registered trademark) is used as the communication protocol in the home network. Alternatively, any other home communication protocol, such as Digital Living Network Alliance (DLNA) (registered trademark) may be used.

(9) In one example according to the foregoing embodiments, BACnet (registered trademark) is used as the communication protocol in the building network. Alternatively, any other building communication protocol, such as LON-WORKS, may be used.

As described above, the detection system according to the foregoing embodiments or the foregoing variations determines whether a log of communication in a first network includes information that indicates anomalous communication in a second network and can thus detect a cyberattack perpetrated via the first network from the second network. In this manner, the detection system can properly detect a cyberattack perpetrated across a plurality of networks including the first network and the second network.

Moreover, the detection system can detect a cyberattack with use of information indicating an anomaly in data included in a communication frame that flows in the first network. Therefore, the detection system can properly detect a cyberattack perpetrated across a plurality of networks more easily.

Moreover, the detection system detects a cyberattack by determining whether a first frame includes a second frame. Herein, the second frame is data that has a format of a frame flowing in the second network but includes improper data, and the second frame can be detected easily through a determination process performed on data included in the frame. Therefore, the detection system can properly detect a cyberattack perpetrated across a plurality of networks more easily.

Moreover, if the detection system has detected anomalous communication of the second network in the first network, the detection system displays, on a screen, an image informing of the anomalous communication in the second network. The anomalous communication in the second network may be caused by an occurrence of a cyberattack on the second network. In this case, it is more desirable to inform the person monitoring the second network than the person monitoring the first network of the occurrence of the anomalous communication in the second network, and the aforementioned screen display allows the person monitoring the second network to be informed of the occurrence of anomalous communication. Therefore, the detection system can properly detect a cyberattack perpetrated across a plurality of networks and contribute to informing the person monitoring the network targeted by the cyberattack of an occurrence of the cyberattack.

Moreover, in the detection system, a common detector efficiently and collectively executes a detection process of detecting an attack that should be detected commonly in a plurality of networks (e.g., a Denial of Service attack detection process or a signature-based intrusion detection process). Therefore, the detection system can properly detect a cyberattack perpetrated across a plurality of networks more efficiently.

Moreover, in the detection system, the individual detector provided for each of the plurality of networks individually executes a detection process of detecting an attack that should be detected individually in each of the plurality of networks. The individual detector performs an individual process corresponding to an attack that can be perpetrated in the network corresponding to the individual detector. In other words, the individual detector does not need to perform a process corresponding to an attack that is perpetrated in another network, not in the corresponding network. Therefore, the processing amount of the executed process can be reduced, which leads to improved efficiency. Furthermore, this may contribute to the reduction in the power consumption. Therefore, the detection system can properly detect a cyberattack perpetrated across a plurality of networks more efficiently.

Moreover, the detection system can properly detect a cyberattack perpetrated across a plurality of networks with possible targets being the in-vehicle network, the home network, and the building network.

Moreover, the detection system can properly detect a cyberattack perpetrated across a plurality of networks with possible targets being the in-vehicle network in which the CAN protocol is used, the home network in which the ECHONET Lite (registered trademark) protocol is used, and the building network in which the BACnet (registered trademark) protocol is used.

Moreover, the detection system can properly detect a cyberattack perpetrated across a plurality of networks with possible targets being a first network and a second network associated with the same user in association information.

Moreover, the detection system can properly detect a cyberattack perpetrated across a plurality of networks more easily by associating the in-vehicle network, the home network, and the building network with use of the identification information, the IP address, or the phone number of the vehicle or with use of the address information, the IP address, the email address, the phone number, or the facsimile number of the home or of the building.

In the foregoing embodiments or the foregoing variations, the constituent elements may each be implemented by dedicated hardware or may each be implemented through the execution of a software program suitable for the corresponding constituent element. The constituent elements may each be implemented as a program executing unit, such as a CPU or a processor, reads out a software program recorded on a recording medium, such as a hard disk or a semiconductor memory, and executes the software program. Herein, the software that implements the detection system and so on according to the foregoing embodiments or the foregoing variations is a program such as the one described below.

Specifically, this program is a program that causes a computer to execute a detection method of obtaining a first log, which is a log of communication in a first network; determining whether the obtained first log includes anomaly information that indicates anomalous communication in a second network; and performing control of providing a notification concerning the anomaly in the second network in response to determining that the first log includes the anomaly information.

Thus far, the detection system and so on according to one or more aspects have been described based on the embodiments, but the present invention is not limited to these embodiments. Unless departing from the spirit of the present invention, an embodiment obtained by making various modifications that are conceivable by a person skilled in the art to the present embodiments or an embodiment obtained by combining the constituent elements in different embodiments may also be encompassed by the scope of the one or more aspects.

INDUSTRIAL APPLICABILITY

The anomaly detection system according to the present disclosure and the technique therein prevent damage that could be caused by a cyberattack perpetrated across networks of a plurality of fields and contribute to the development of an anomaly detection system aimed to detect a security anomaly promptly and efficiently.

The invention claimed is:

1. A detection system, comprising:
a processor; and
a memory including a program that, when executed by the processor, causes the processor to perform functions, the functions including:
  receiving, via at least one third network, a first log, the first log being a log of first communication data in a first network, the first log being generated by a first device connected to the first network;
  determining whether the first log includes first anomaly information indicating an anomalous communication directed to a second network, the second network being different from and not connected directly to the first network; and
  sending a notification indicating the anomalous communication to the second network, when the processor determines that the first log includes the first anomaly information,
wherein the processor receives, as the first log, a log of a first frame, the first frame being a communication frame that flows in the first network,
the processor uses information indicating an anomaly in data included in the first frame to determine whether the first log includes the first anomaly information, and
the information indicating the anomaly in the data included in the first frame indicates that the first frame includes a second frame, the second frame being a second communication frame that is to flow in the second network, the second frame having a frame format compliant with a communication protocol used in the second network, the second frame including, in a field of the second frame, data that is non-compliant with the frame format.

2. The detection system according to claim 1, wherein the processor controls display of an image indicating an occurrence of the anomalous communication directed to the second network on a screen for notifying of an anomaly in the second network.

3. The detection system according to claim 1, wherein the second network includes one or more second networks, and the processor:
  includes an individual detector provided for each of the one or more second networks, each individual detector performing an individual detection process of detecting the anomalous communication directed to the second network based on the first log; and
  determines that the first log includes the first anomaly information when the individual detector for one of the one or more second networks, selected in accordance with contents of the first log, detects the anomalous communication in the individual detection process.

4. The detection system according to claim 1, wherein the first network is selected from an in-vehicle network, a home network, or a building network, and the second network includes one or more of the in-vehicle network, the home network, or the building network and excludes the first network.

5. The detection system according to claim 4, wherein first communication compliant with a first predetermined protocol is performed in the in-vehicle network, second communication compliant with a second predetermined protocol is performed in the home network, and third communication compliant with a third predetermined protocol is performed in the building network.

6. A detection system, comprising:
a processor; and
a memory including a program that, when executed by the processor, causes the processor to perform functions, the functions including:
  receiving, via at least one third network, a first log, the first log being a log of first communication data in a first network, the first log being generated by a first device connected to the first network;
  determining whether the first log includes first anomaly information indicating an anomalous communication directed to a second network, the second network being different from and not connected directly to the first network; and
  sending a notification indicating the anomalous communication to the second network, when the processor determines that the first log includes the first anomaly information, wherein
the processor performs a Denial of Service attack detection process or a signature-based intrusion detection process on each of the first log and a second log, and
the functions further include:
  obtaining the second log, the second log being a log of second communication data in the second network;
  determining whether the second log includes second anomaly information indicating an anomalous communication directed to the first network;
  determining that the first log includes the first anomaly information when the processor detects a Denial of Service attack in the Denial of Service attack detection process or when the processor detects an unauthorized communication in the signature-based intrusion detection process; and
  determining that the second log includes the second anomaly information when the processor detects the Denial of Service attack in the Denial of Service attack detection process or when the processor detects the unauthorized communication in the signature-based intrusion detection process.

7. A detection system, comprising:
a processor; and
a memory including a program that, when executed by the processor, causes the processor to perform functions, the functions including:
  receiving, via at least one third network, a first log, the first log being a log of first communication data in a first network, the first log being generated by a first device connected to the first network;
  determining whether the first log includes first anomaly information indicating an anomalous communication directed to a second network, the second network being different from and not connected directly to the first network; and sending a notification indicating the anomalous communication to the second network, when the processor determines that the first log includes the first anomaly information, wherein the processor includes association information indicating that the second network is associated with a second user identical to a first user associated with the first network, the processor:

identifies the second network associated, in the association information, with the second user identical to the first user associated, in the association information, with the first network corresponding to the first log; and performs control of notifying of an anomaly in the second network, when the first network or the second network is an in-vehicle network, the association information includes vehicle identification information, an IP address, or a phone number of a vehicle provided with the in-vehicle network, when the first network or the second network is a home network, the association information includes address information, an IP address, an email address, a phone number, or a facsimile number of a home provided with the home network, and when the first network or the second network is a building network, the association information includes address information, an IP address, an email address, a phone number, or a facsimile number of a building provided with the building network.

* * * * *